United States Patent Office 3,387,044
Patented June 4, 1968

3,387,044
PROCESS FOR FLUORINATING COMPOUNDS
CONTAINING A GEM-DINITRO GROUP
Vytautas Grakauskas, Arcadia, and Edward E. Hamel,
Citrus Heights, Calif., assignors to Aerojet-General
Corporation, Azusa, Calif., a corporation of Ohio
No Drawing. Filed July 27, 1962, Ser. No. 214,169
21 Claims. (Cl. 260—644)

This invention relates to a novel method of fluorinating organic compounds containing at least one terminal gem-dinitro group.

It is an object of this invention to prepare terminal gem-dinitro compounds in a novel manner. It is another object of this invention to fluorinate organic gem-dinitro compounds in a more selective and controllable manner. These and other objects of this invention will be apparent from the detailed description which follows.

The novel process of this invention involves the fluorination of organic compounds containing at least one terminal gem-dinitro grouping of the formula

wherein M is hydrogen or any metal cation. The free valence of the above group may be satified by essentially any organic radical. The exact nature of the organic portion of the molecule is not critical since the fluorination reaction occurs at the site of the hydrogen or metal cation, to form the grouping

with hydrogen fluoride or metal fluoride salts being produced as by-products. It is to be understood that the organic compound which is fluorinated may contain several of these terminal gem-dinitro groupings.

Likewise, in the case of polyvalent metals, several of the

portions of the terminal group may be attached to a single metal cation. Thus, for example, when calcium is the cation, the terminal group of the compound to be fluorinated has the formula

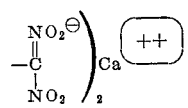

Fluorination of such a group yields two

groups.

The reaction between fluorine and organic compounds having at least one of the above-described terminal groups, i.e., an organic gem-dinitro compound or salt thereof, proceeds in accordance with the following general reaction equation:

(I)
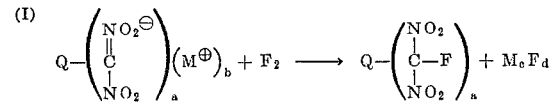

wherein Q is a monovalent or polyvalent organic radical, M is a metal cation or hydrogen, and $a$, $b$, $c$ and $d$ are small whole numbers of from 1 to about 5. As can be seen from the foregoing equation, $a$ times the valence of organic portion of this reactant equals $b$ times the valence of M. Illustrative of the metal cations M suitable for use in the above reaction are the metals in Groups I-A and II-A of Period 2, Groups I-A, II-A and III-A of Period 3; Groups I-A, II-A, III-A, IV-A, I-B, II-B, III-B, IV-B, V-B, VI-B and VII-B of Period 4; Groups I-A, II-A, III-A, IV-A, V-A, I-B, II-B, III-B, IV-B, V-B, VI-B and VII-B of Period 5; Groups I-A, II-A, III-A, IV-A, V-A, VI-A, I-B, II-B, III-B, IV-B, V-B, VI-B and VII-B of Period 6; and all of the elements of Groups VIII of the Periodic Table as it appears in the Handbook of Chemistry and Physics, 42nd edition, pages 448 and 449. Specific examples of such metals are sodium, potassium, beryllium, magnesium, calcium, barium, titanium, zirconium, tin, lead, vanadium, antimony, bismuth, chromium, molybdenum, tungsten, manganese iron, cobalt, nickel, platinum, copper, silver, gold, mercury, cadmium, zinc, aluminum, etc.

Preferred metals are those in Periods 2–4, i.e., those elements having atomic members 3, 4, 11–13 and 19–32. More preferably, M is an alkali metal cation such as lithium, sodium, or potassium. When M is an alkali metal cation, in reaction (I), above, $a$ is numerically equal to $b$.

In general, the metal cation is introduced into the reactant

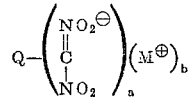

by treating the corresponding gem-nitro compound

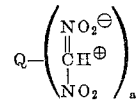

with the hydroxide of the metal cation M. For example, the sodium ion is introduced by treating the corresponding gem-dinitro compound with sodium hydroxide. Similarly, the calcium, aluminum, potassium and magnesium salts are obtained from the free gem-dinitro compound by reaction with calcium hydroxide, aluminum hydroxide, potassium hydroxide and magnesium hydroxide, respectively.

As has been indicated above, Q in the above reaction equation can be any monovalent or polyvalent organic radical.

For example, compounds of the formula

wherein R is a substituted or unsubstituted hydrocarbyl or monovalent heterocyclic radical, preferably having from 1 to about 20 atoms; may be prepared from the corresponding gem-dinitro compound or metal salt thereof in accordance with this invention. Typical of suitable hydrocarbyl radicals are alkyl radicals, alkenyl radicals, aryl radicals, cycloalkyl radicals, alkaryl radicals and aralkyl radicals. Typical of suitable alkyl radicals are those having from 1 to about 20 carbon atoms, such as methyl ethyl, propyl, dodecyl, eicosyl, etc. Preferred cycloalkyl radicals are cyclohexyl and cyclopentyl radicals. Illustrative aryl radicals are those having from 1 to about 12 carbon atoms such as phenyl, naphtylo, anthracyl, etc. Typical aralkyl and alkaryl radicals are benzyl and tolyl. In general, the lower hydrocarbyl radicals are preferred, i.e., those having less than 10 carbon atoms since such compounds have a higher percentage of the energetic $NO_2$ groups, thus rendering the products more effective as explosives.

Suitable monovalent hetercyclic radicals are, for example, pyridyl, furyl, tetrazolyl, tetrazinyl, benzothiofuryl, thienyl, pyrryl, etc. Preferred monovalent heterocyclic radicals are those containing 5 or 6 atoms in the ring, 1 to 4 of which are nitrogen atoms with the balance of the ring being carbon atoms.

It should be understood that any of the above-mentioned monovalent organic radicals may carry from 1 up to about 5 substituent groups such as nitro, hydroxy, halogen, sulpho, carboxy, etc.

These substituted radicals include nitroalkyl, nitroaryl, haloalkyl, haloaryl, hydroxy alkyl, carboxy alkyl, etc. Typical of specific substituent-carrying radicals are the nitroethyl, methyol, ethylol, pentachlorophenyl, hydroxy phenyl, trifluoropropyl, 2-sulfoethyl, nitropyridyl, ω-carboxypropyl, and 2,5-dichlorocyclohexyl groups.

As is obvious from the foregoing, when R is a substituted or unsubstituted, hydrocarbyl or heterocyclic radical in the above formula, compounds such as 1-fluoro-1,1-dinitroethane;
1-fluoro-1,1-dinitro-2-sulfo-ethane;
1-fluoro-1,1-dinitropropane;
1-fluoro-1,1-dinitroethanol;
1-fluoro-1,1,3,3-tetranitropentane;
1-fluoro-1,1-dinitrodecane;
fluoro-phenyldinitromethane;
fluoropentachlorophenyl-dinitromethane;
4-fluoro-4,4-dinitrobutyric acid;
fluoro-cyclohexyl-dinitromethane;
fluoro-cyclopentyldinitromethane;
1-fluoro-1,1-dinitropropylene;
1-fluoro-1,1-dinitrododecane;
fluoro-anthracyl-dinitromethane;
fluoro-biphenylyldinitromethane;
1,4-dichloro-3-(fluorodinitromethyl)benzene;
fluoro-tolyl-dinitromethane;
fluoro-benzyl-dinitromethane;
5(fluorodinitromethyl)tetrazole;
2(fluorodinitromethyl)pyridine;
2(fluorodinitromethyl)-3,3-dibromopiperazine;
2(fluorodinitromethyl)-4-methyl-quinoline;
1-fluoro-1,1-dinitro-2-chloroethane and
2(fluorodinitromethyl)furan are obtainable.

In addition to those above-mentioned, other compounds prepared according to this invention include those containing monovalent radicals which are interrupted by hetero-atoms such as sulfur, oxygen and nitrogen. These hetero-interrupted compounds have the formula

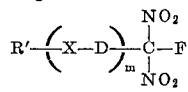

wherein R' is hydrocarbyl such as alkyl or aryl; X is aza $$\left( \begin{array}{c} H \\ | \\ -N- \end{array} \right)$$

nitro-substituted nitrogen (nitraza), oxygen or sulfur, D is alkylene or arylene, and m is a small whole number of from 1 to about 5. Preferably R' and D contain from 1 to about 10 carbon atoms. The groups R' and D may carry up to about 5 substituents such as nitro or halo, i.e., R' may be nitroalkyl, nitroaryl, haloalkyl, haloaryl, etc., and D may be nitroalkylene, haloalkylene, haloarylene, nitroarylene, etc.

The following is a compound containing a hetero oxygen atom:

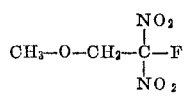

Typical of the compounds containing the hetero sulfur atom is the compound of the formula

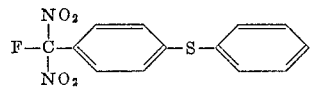

The following typifies a compound containing a hetero nitrogen atom

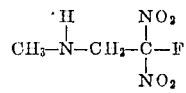

Other compounds containing the above-mentioned hetero-interrupted groups include 1-fluoro-1,1-dinitro-2-methoxy ethane;
1-fluoro-1,1-dinitro-3-thio-pentane;
1-fluoro-1,1-dinitro-3-nitraza hexane;
1-fluoro-1,1-dinitro-3-aza octane;
3,3-dinitro-3-fluoropropyl ether;

and the like.

In addition to those monovalent groups already mentioned there may be attached to the

group of the compounds of this invention, monovalent radicals containing linkages such as

and the like. Thus, this invention encompasses gem-dinitro ester compounds of the formula

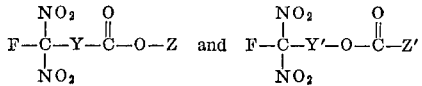

wherein Y and Y' are alkylene or arylene radicals and Z and Z' are monovalent organic radicals, and preferably a hydrocarbyl radical such as alkyl or aryl. Groups Y, Y', Z and Z' may also carry substituents such as nitro, halo and hydroxy. Compounds produced by the process of this invention and containing the group of the formula

include methyl-4-fluoro-4,4-dinitrobutyrate;
methyl-4,4,6,6-tetranitro-6-fluorohexanoate;
3,3-dinitro-3-fluoropropyl acetate;
2,2-dinitro-2-fluoroethyl benzoate;

and the like.

When Q is a divalent organic radical in reaction (I), illustrative and preferred compounds prepared according to said reaction have the formulae

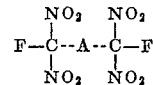

wherein A may be, for example, alkylene, arylene, or have any of the following formulas

—E—X—E'—

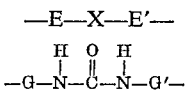

or

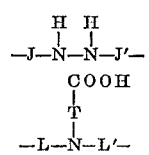

wherein E, E', G, G', R'', R''', J, J', L, L' and T are alkylene or arylene and X is nitrogen, nitraza, sulfur or oxygen. Any of the groups represented generically by A in the above formulas may carry substituents such as halogen, nitro, sulfo, hydroxy and carboxy groups. Preferably the groups A, E, E', G, G', R'', R''', J, J', L, L' and T are lower alkylene, arylene, nitroalkylene, nitroarylene, haloalkylene and haloarylene; and contain from 1 to about 10 carbon atoms.

Illustrative of compounds produced in accordance with reaction (I) wherein Q is divalent are: N, N-bis(2-fluoro-2, 2-dinitroethyl) glycine; N,N'-bis(2-fluoro-2,2-dinitroethyl) hydrazine; bis(3,3-dinitropropyl)maleate; N,N'-bis (2-fluoro-2, 2-dinitroethyl)urea; N-nitro-2,2'-difluoro-2, 2,2'2' - tetranitrodiethylamine; 1,5 - difluoro-1,1,5,5-tetranitro-3-thio pentane; 1,10-difluoro-1,1,10,10-tetranitrodecane; and α,α'-difluoro-α,α,α'α'-tetranitro-p-xylene.

In summary, the Q radical in the products obtained by carrying out reaction (I), above, preferably are mono- or divalent organic radicals, the most desirable monovalent organic radicals being selected from the grouping consisting of R—,

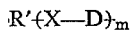

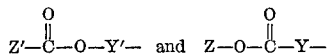

and the most desirable divalent organic radicals being selected from the group consisting of
alkylene
arylene

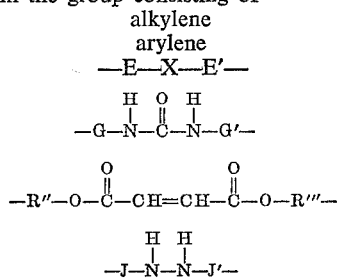

and

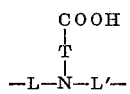

wherein R, R' X, D, Y, Y', Z, Z', E, E', G, G', R'', R''', J, J', L, L', T and $m$ are as previously defined.

The aforementioned reactions of this invention are carried out in a substantially inert moderator. The term "substantially inert" as used throughout the specification and claims is intended to include any moderator which is less reactive with fluorine than the gem-dinitro compound being fluorinated.

The most suitable substantially inert moderators are those less than one quarter as reactive with fluorine as the gem-dinitro compounds. The moderator of this invention is any polar or non-polar material in which the gem-dinitro compound beng fluorinated is at least partially soluble. Thus the moderator may be a complete solvent for the material being fluorinated. Likewise, the moderaor may be a material in which the gem-dinitro compound forms only a partial suspension. Preferably, although not necessarily, the gem-dinitro compound is soluble in the moderator at least to the extent of 1 part by weight per 100 parts of the moderator. Use of the moderator is an essential part of the fluorination reaction. The moderator serves not only as a carrier for the reaction but is also essential to the controlled fluorination of the gem-dinitro compound.

We are not certain as to the exact mechanism by which the moderators control the fluorination. However, the moderator is known to serve as more than a carrier for the reaction since omission of the moderator results in rapid random fluorination of the gem-dinitro compound to the extent of decompostion and contamination of the ultimate product. Further, the moderator promotes selective fluorination, i.e., the fluorination will occur only in the most reactive site in the gem-dinitro compound.

The specific moderator chosen is not critical and its selection depends upon such factors as cost, availability, inertness and solvent characteristics.

The preferred moderators are those polar and non-polar materials which are liquid within a temperature range of about —40° C. to about +40° C. This does not mean that our moderator must be liquid throughout this entire range. Rather, our preferred moderators are liquid over at least some portion of this range, that is, they have a normal melting point either below or within this range. Typical of the suitable moderators for use in the practice of this invention are the hydrocarbon alkanes and especially the hydrocarbon alkanes having from 5 to about 10 carbon atoms, such as pentane, hexane, octane, nonane and decane. Another group of suitable moderators are the haloalkanes having from 1 to about 8 carbon atoms, such as methylene dichloride, ethylene chloride, chloroform and carbon tetrachloride. Still another class of moderators are the aromatic hydrocarbons having from 6 to about 12 carbon atoms, such as benzene, toluene and the ortho, meta and para isomers of xylene. The chlorinated aromatic hydrocarbons containing 6 to 12 carbon atoms may also be used. Illustrative of these are monochlorobenzene and chlorotoluene.

Other suitable moderators include the aliphatic ketones, having the formula

and ethers having the formula

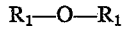

and the dialkyl substituted amides having the formula

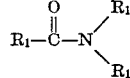

wherein in the above formula the $R_1$ groups are alkyl, and preferably lower alkyl having from 1 to about 10 carbon atoms, such as methyl, ethyl, pentyl and octyl. Specific ketones include dimethyl ketone, diethyl ketone and methyl, ethyl ketone. The ethers include dimethyl ether, diethyl ether and diisopropyl ether. The substituted amides include dimethyl formamide, diethyl formamide and dimethyl acetamide.

Still other moderators are water, the lower alkanols having from 1 to about 10 carbon atoms and the lower alkylene glycols having from 1 to about 10 carbon atoms. Suitable lower alkanols and alkylene glycols include methanol, ethanol, isopropanol, ethylene glycol, propylene glycol and butylene glycol.

Preferred among the foregoing moderators are the polar solvents such as water, the lower alkanols and the lower alkylene glycols.

It is to be understood that mixtures of any of the foregoing moderators may be employed in the practice of this invention. Water is the preferred moderator because of its low cost and ready availability. However, lower aliphatic alcohols such as methanol, ethanol, and isopropanol have been found to give very good results. It is surprising that the fluorination reaction can be carried out in lower aliphatic alcohols since the introduction of fluorine into the lower aliphatic alcohol would normally be expected to cause fires and explosions. Fluorination reactions of this invention were found to proceed very satisfactorily in the lower aliphatic alcohols.

The amount of the moderator employed is not critical. Normally the weight ratio of moderator to the gem-dinitro compound being fluorinated is within the ratio from about 0.5 to about 200, and more preferably within the range from about 1.0 to about 20.

The temperature at which these fluorination reactions are carried out is not critical. Normally it is desirable to keep the temperature as low as possible when working with fluorine, and thus the preferred reaction temperature is between about −40° C. and about +40° C. More preferably the reaction is carried out between the temperature of about −5° C. and +5° C.

The fluorine gas used in this invention may be diluted with an inert gas such as helium or nitrogen so as to improve the control of the rate of fluorine addition.

The fluorinations of this invention may be carried out in any conventional reactor. However, for long reactor life, those portions of the reactor which come in contact with fluorine should be coated with material such as nickel or polyethylene.

In the fluorinations of this invention the proportions of the reactants are not critical. Normally the organic primary gem-dinitro compound and fluorine should be used in approximately stoichiometrically equivalent amounts since the use of excessive fluorine may cause extensive reaction with the moderator resulting in undesirable contamination of the desired product.

The gem-dinitro compounds of this invention may be isolated in conventional manner, i.e., by filtration, crystallization, extraction and/or distillation.

Fluorination reactions in this invention may be carried out under any suitable pressure. Normally atmospheric pressure is used since it is most convenient. However, it may be sometimes desirable to conduct the fluorination under elevated pressure in order to increase the solubility of the fluorine in the moderator.

The examples which follow are presented only for purposes of illustration and should not be regarded as limitative of the scope of our invention in any way. In the examples, percentages are by weight and gas volumes are at standard temperature and pressure unless otherwise indicated.

Example I.—Preparation of 1-fluoro-1,1-dinitroethanol

To about 0.25 mole of potassium 1,1-dinitroethanol was added 180 ml. of water. The stream of fluorine (2–3 liters per hour) diluted with helium (10 liters per hour) was passed at 25–30° C. into the solution of potassium 1,1-dinitroethanol for a period of 4 hours. The mixture was stirred vigorously during the course of the reaction, and cooling had to be applied to control the reaction temperature. Ten liters of fluorine gas were required to complete the reaction. The reaction mixture was extracted with five 71 ml. portions of ethyl ether and the combined extracts were dried over anhydrous sodium sulfate and filtered. The solvent was removed from the solution at room temperature and aspirator pressure to give 25 grams of pale yellow liquid. The crude material was purified by vacuum distillation to yield 17.0 grams of water-clear liquid. The liquid material was redistilled to yield 15 grams of colorless liquid. This material was 1-fluoro-1,1-dinitroethanol, as shown by elemental analysis.

Example II.—Preparation of phenyl dinitro fluoromethane

When phenyl dinitro methane [prepared by the method disclosed by Kaplan et al., J.A.C.S., 83, 3535 (1961)] is fluorinated according to the conditions set forth in Example I, phenyl dinitro fluoromethane having the structural formula

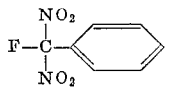

is obtained in good yield.

Example III.—Preparation of 1-fluoro-1,1-dinitroethane

The potassium salt of 1,1-dinitroethane was prepared in a one liter three-necked round-bottom flask equipped with a stirrer. To a cold solution of 27.4 grams of 85 percent potassium hydroxide in 750 ml. of water was added slowly with vigorous stirring 50 grams of 1,1-dinitroethane over a period of 15 minutes. The reaction flask was equipped with a gas-inlet and gas-outlet tubes and a stream of fluorine (3 to 4 liters per hour) diluted with helium (10 to 12 liters per hour) was passed into the aqueous potassium 1,1-dinitroethane solution at 20 to 25° C. for a period of four hours. At the end of this period the reaction mixture was extracted with two 50 ml. portions of ethyl ether and the combined extracts were washed with 100 ml. of 10 percent aqueous sodium dicarbonate followed by 100 ml. of water. The solution was dried over anhydrous sodium sulfate, filtered, and the filtrate concentrated at aspirator pressure to leave 15 grams of pale-yellow liquid. The crude liquid was purified by distillation to give 12 grams of colorless liquid, having a boiling point of 40–41° C./20 mm. This material was 1-fluoro-1,1-dinitroethane.

The above example was repeated using 1,1-dinitro propane in lieu of 1,1-dinitro ethane to give 1-fluoro-1,1-dinitro propane. This material was found to have an index of refraction of 1.4050.

Example IV.—Preparation of 1,3-difluoro-1,1,3,3-tetranitro-propane

The di-potassium salt of 1,1,3,3-tetranitro-propane is prepared by neutralization of 1,1,3,3-tetranitro propane with potassium hydroxide. This salt is then added to chloroform and fluorinated under the conditions of Example III for about 3 hours. Upon completion of fluorination, the product is isolated and found to be 1,3-difluoro-1,1,3,3-tetranitro-propane.

When the foregoing example is repeated using the calcium salt of 3,3-dinitro-propionic acid in lieu of the di-potassium salt of 1,1,3,3-tetranitro-propane, and ethylene glycol instead of chloroform as the moderator, 3-fluoro-3,3-dinitro propionic acid is obtained in good yield.

Example V.—Preparation of bis(3-fluoro-3,3-dinitro-propyl)maleate

One mole of maleic acid is esterified with two moles of 3,3-dinitropropanol in the presence of a condensation catalyst. Bis(3,3-dinitropropyl) maleate is obtained in good yield. This ester is converted to the dibarium salt by neutralization with barium hydroxide. The salt is then added to benzene and fluorinated for about 4–6 hours under the conditions described in Example II. The fluorinated ester is isolated and found to be bis(3-fluoro-3,3-dinitro-propyl) maleate.

When this example is repeated with other esters, similar results are obtained. Thus, substitution of 3,3-dinitropropyl acetate; 3,3-dinitropropyl benzoate; and methyl 4,4,6,6-tetranitrohexanoate; for bis(3,3-dinitropropyl) maleate in the above example yields 3-fluoro-3,3-dinitropropyl acetate; 3-fluoro-3,3-dinitro propyl benzoate and methyl 4,4,6,6-tetranitro-6-fluoro hexanoate, respectively.

When the above-mentioned esters are fluorinated in the presence of dimethyl acetamide as the moderator, satisfactory results are obtained.

Example VI.—Preparation of N,N'-bis(2-fluoro-2,2-dinitroethyl) hydrazine

N,N'-bis(2,2-dinitroethyl) hydrazine is fluorinated in methanol under the conditions described in Example I. The product which is obtained in good yield, is N,N'-bis(2-fluoro-2,2-dinitroethyl) hydrazine.

When the preceding example is repeated using N,N-bis (2,2-dinitroethyl) urea instead of N,N'-bis(2,2-dinitroethyl) hydrazine, a good yield of N,N'-bis(2-fluoro-2,2-dinitroethyl) urea is obtained.

Example VII.—Preparation of di-(3-fluoro-3,3-dinitropropyl) ether

This compound is prepared under the conditions of fluorination set forth in Example I from di-(3,3-dinitropropyl) ether.

When di-(3,3-dinitropropyl) ether is fluorinated, using hexane as the moderator, di-(3-fluoro-3,3-dinitropropyl) ether is likewise obtained.

Example VIII.—Preparation of N-nitro-2,2'-difluoro-2,2,2',2'-tetranitrodiethylamine Ten grams of the dipotassium salt of N-nitro-2,2,2',2'-tetranitrodiethylamine [prepared in the manner disclosed by Klager, Journal Organic Chemistry, 23, 1519, (1958)] were suspended in 10 ml. of water. The system was purged with nitrogen for 5 minutes and then fluorine added. The flow of fluorine was continued for 3 hours while the temperature was kept at 18–20° C. and rapid agitation maintained. During this time, the solution turned from yellow to almost colorless. The slightly yellow precipitate was collected, washed with water, and dried under vacuum. The crude product was placed in 50 ml. of ethylene chloride and filtered to remove the undissolved material. To remove any amine present, the ethylene chloride solution was washed 4 times with 10 ml. portions of a 1 percent sodium bicarbonate solution. After concentrating the solution from 50 ml. to 5 ml., the N-nitro-2,2'-difluoro-2,2,2',2' - tetranitrodiethylamine crystallized out at −10–0° C. The white crystals were collected and dried (M.P. 84–85° C.).

Example IX.—Preparation of 1-fluoro-1,1-dinitro-3,3-dichloropropane

Potassium hydroxide is added to 1,1-dinitro-3,3-dichloropropane until the latter is completely neutralized. The potassium salt thus obtained is then added to 1-propanol, which acts as the moderator. Fluorination is then carried out, employing the conditions described in Example I. The 1-fluoro-1,1-dinitro-3,3-dichloropropane which is isolated is obtained in good yield.

Example X.—Preparation of 1-fluoro-1,1,3,3-tetranitrobutane

The magnesium salt of 1,1,3,3-tetranitrobutane is fluorinated at about 0° C. for about 4–5 hours using a gas stream which is approximately a 50/50 mixture of fluorine and helium. Diethyl ether is used as the moderator. The product obtained is found to be 1-fluoro-1,1,3,3-tetranitrobutane.

Example XI.—Preparation of 4-fluoro-2,2,4,4-tetranitrobutylacetate

The aluminum salt of 2,2,4,4-tetranitrobutylacetate is fluorinated under the conditions of Example X, using nonane as the moderator. The product obtained is 4-fluoro-2,2,4,4-tetranitrobutylacetate.

Example XII.—Preparation of 3,3'-difluoro-3,3,3',3'-tetranitro-2,2'-dichlorodipropylamine The compound 3,3'-difluoro-3,3,3',3'-tetranitro-2,2'-dichlorodipropylamine is prepared by the fluorination of the diferric salt of 3,3,3',3'-tetranitro-2,2'-dichlorodipropylamine under the conditions of Example I, using dimethyl ketone as the moderator.

Example XIII.—Preparation of 1-fluoro-1,1-dinitro-4-nitraza heptane

To about 200 ml. of dimethyl formamide is added about 0.25 mole of 1,1-dinitro-4-nitraza heptane. This compounds is fluorinated at about 30° C. for 4–5 hours. The product which is separated is 1-fluoro-1,1-dinitro-4-nitraza heptane.

Example XIV.—Preparation of 2-fluoro-2,2-dinitroethyl benzoate

To one mole of 2,2-dinitroethanol is added one mole of benzoic acid. A small amount of trifluoroacetic acid is added as a condensation catalyst. Esterification is carried out for 1–2 hours at about 75° C. The ester obtained is 2,2-dinitroethyl benzoate. This ester is then fluorinated in water at about 10° C. for 2–3 hours. The fluorinated ester obtained is found by elemental analysis to be 2-fluoro-2,2-dinitroethyl benzoate.

In the preparation of the fluorodinitro compounds of this invention it is sometimes desirable to agitate the ingredients so as to insure more intimate contact, and thereby improve rate of reaction.

The novel terminal fluorodinitro compounds of this invention contain a plurality of nitro groups and are thus inherently useful as explosives. These compounds can be used in any conventional explosive missile, projectile, rocket, or the like, as the main explosive charge. An example of such a missile is disclosed in U.S. Patent No. 2,470,162, issued May 17, 1949. One way of using the high explosives in a device such as that disclosed in U.S. Patent No. 2,470,162 is to pack the crystalline explosive in powder form into the warhead of a missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time-fuse mechanism firing a detonating explosive such as lead azide or mercury fulminate. In addition, the novel compounds of this invention find application as high energy components in rocket fuel formulations. For example, these compounds may be used as oxidizers for liquid rocket fuels such as hydrazine.

It will be understood that various modifications may be made in this invention without departing from the spirit thereof or the scope of the appended claims.

We claim:

1. The method of preparing organic compounds of the formula

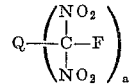

which comprises reacting fluorine, in about a stoichiometric amount, with a compound of the formula

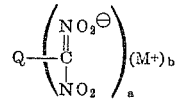

wherein in the above formulae Q is selected from the group consisting of monovalent and polyvalent organic radicals, M is selected from the group consisting of hydrogen and a metal cation, and $a$ and $b$ are small whole numbers of from 1 to about 5, in the presence of a substantially inert moderator.

2. The method of claim 1 wherein the moderator is selected from the group consisting of water, lower alkanols, and lower alkylene glycols.

3. The method of claim 1 wherein M is an alkali metal cation.

4. The method of preparing organic compounds of the formula

which comprises reacting fluorine, in about a stoichiometric amount, with a compound of the formula

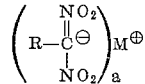

wherein in the above formulae, R is selected from the group consisting of hydrocarbyl, ω-hydroxyhydrocarbyl, nitrohydrocarbyl and halohydrocarbyl, M is selected from the group consisting of hydrogen and a metal cation, and $a$ is a small whole number of from 1 to about 5, in the presence of an inert moderator.

5. A method in accordance with claim 4 wherein the moderator is a polar solvent.

6. A method in accordance with claim 5 wherein the polar solvent is water.

7. A method in accordance with claim 5 wherein the polar solvent is a lower alkanol.

8. A method in accordance with claim 5 wherein the polar solvent is methanol.

9. The method of preparing organic compounds of the formula

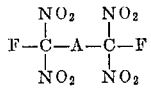

which comprises reacting fluorine, in about a stoichiometric amount, with a compound of the formula

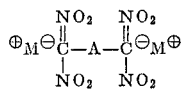

wherein in the above formulae, A is selected from the group consisting of alkylene, arylene, nitroalkylene, nitroarylene, haloalkylene, haloarylene and divalent organic radicals of the formula

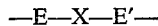

wherein E and E' are selected from the group consisting of alkylene and arylene and X is selected from the group consisting of oxygen, sulfur, aza and nitraza, M is selected from the group consisting of hydrogen and an alkali metal cation; in the presence of an inert moderator.

10. A method in accordance with claim 9 wherein the moderator is a polar solvent.

11. A method in accordance with claim 10 wherein the polar solvent is water.

12. A method in accordance with claim 10 wherein the polar solvent is methanol.

13. The method of preparing organic compounds of the formula

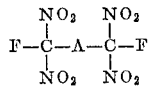

which comprises reacting fluorine, in a stoichiometric amount, with a compound of the formula

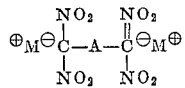

wherein in the above formulae, A is selected from the group consisting of alkylene, arylene, nitroalkylene, nitroarylene, haloalkylene, haloarylene and divalent organic radicals of the formula

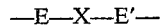

wherein E and E' are selected from the group consisting of alkylene and arylene and X is selected from the group consisting of oxygen, sulfur, aza and nitraza, M is selected from the group consisting of hydrogen and an alkali metal cation; in the presence of ethanol as the moderator.

14. The method of preparing organic compounds of the formula

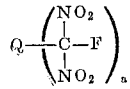

which comprises reacting fluorine, in about a stoichiometric amount, with a compound of the formula

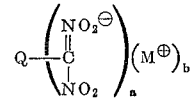

wherein in the above formulae Q is selected from the group consisting of monovalent and polyvalent organic radicals, said monovalent organic radicals being selected from the group consisting of hydrocarbyl, $\omega$-hydroxyhydrocarbyl, nitrohydrocarbyl, halohydrocarbyl, the group $R'\text{-}(X\text{-}D)_m$ wherein $R'$ is selected from the group consisting of alkyl and aryl, X is selected from the group consisting of aza, nitraza, oxygen and sulfur, D is selected from the group consisting of alkylene and arylene, and $m$ is a whole number of from 1 to about 5; the group

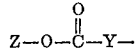

wherein Z is hydrocarbyl and Y is selected from the group consisting of alkylene and arylene; and the group

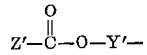

wherein Z' is hydrocarbyl and Y' is selected from the group consisting of alkylene and arylene; and said divalent organic radicals being selected from the group consisting of alkylene, arylene, the group having the formula

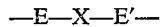

wherein E and E' are selected from the group consisting of alkylene and arylene and X is selected from the group consisting of aza, nitraza, sulfur and oxygen, the group

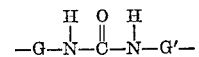

wherein G and G' are selected from the group consisting of alkylene and arylene, the group

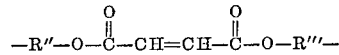

wherein R'' and R''' are selected from the group consisting of alkylene and arylene, the group

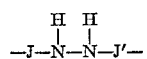

wherein J and J' are selected from the group consisting of alkylene and arylene, and the group

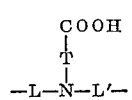

wherein L, L' and T are selected from the group consisting of alkylene and arylene; M is selected from the group consisting of hydrogen and a metal cation; and $a$ and $b$ are small whole numbers of from 1 to about 5; in the presence of a substantially inert moderator.

15. A method in accordance with claim 14 wherein the moderator is a polar solvent.

16. A method in accordance with claim 15 wherein the polar solvent is water.

17. A method in accordance with claim 15 wherein the polar solvent is methanol.

18. A method in accordance with claim 15 wherein the polar solvent is ethanol.

19. A method in accordance with claim 15 wherein the polar solvent is ethylene glycol.

20. A method in accordance with claim 15 wherein the polar solvent is diethyl ether.

21. A method of preparing 1-fluoro-1,1-dinitroethane which comprises reacting fluorine, in about a stoichiometric amount, with the potassium salt of 1,1-dinitroethane in a water moderator.

References Cited

UNITED STATES PATENTS 2,891,994  6/1959  Klager _____ 260—644 X

OTHER REFERENCES

Frankel: J. Org. Chem., vol. 23 (June 1958), pp. 813–815.

CARL D. QUARFORTH, *Primary Examiner.*

LEON D. ROSDOL, REUBEN EPSTEIN, *Examiners.*

J. W. WHISLER, L. A. SEBASTIAN,
*Assistant Examiners.*